United States Patent [19]

Price et al.

[11] Patent Number: 4,838,373

[45] Date of Patent: Jun. 13, 1989

[54] SUSPENSION STRUCTURE FOR A TRACKED VEHICLE

[75] Inventors: Robert J. Price, Dunlap; James E. Gee, Washington; Andrew J. Tonsor, East Peoria; Ronald L. Satzler, Princeville; Samuel B. Stevens, Pekin, all of Ill.

[73] Assignee: Caterpillar Inc., Peoria, Ill.

[21] Appl. No.: 213,793

[22] Filed: Jun. 30, 1988

[51] Int. Cl.[4] .................... B62D 55/00; B62D 55/27
[52] U.S. Cl. .................... 180/9.46; 180/9.5; 305/27
[58] Field of Search ............ 305/25, 27, 21, 22, 305/28, 16, 29; 180/9.46, 9.5, 9.54, 9.58, 242

[56] References Cited

U.S. PATENT DOCUMENTS

| | | | |
|---|---|---|---|
| 1,353,945 | 9/1920 | Blewett | 180/9.5 |
| 1,407,972 | 2/1922 | Wickersham | |
| 1,522,157 | 1/1925 | Tracy et al. | |
| 2,670,249 | 2/1954 | Pilch | 305/8 |
| 2,786,724 | 3/1957 | Armington et al. | 305/9 |
| 2,988,159 | 6/1961 | Weber | 180/9.5 |
| 3,142,352 | 7/1964 | Johansson | 305/27 |
| 3,825,088 | 7/1974 | Copeland | 180/9.5 |
| 3,889,769 | 6/1975 | Blomstrom et al. | 180/9.5 |
| 3,913,987 | 10/1975 | Baldwin et al. | 305/27 |
| 3,974,891 | 8/1976 | Persson | 180/9.44 |
| 4,132,154 | 1/1979 | Nishiba | 91/491 |
| 4,226,293 | 10/1980 | Bieker | 180/9.5 |
| 4,324,303 | 4/1982 | Balzer et al. | 180/9.5 |
| 4,364,443 | 12/1982 | Sato et al. | 180/9.5 |
| 4,483,406 | 11/1984 | Smith | 180/9.5 |
| 4,557,346 | 12/1985 | Guignard et al. | 180/242 |
| 4,690,231 | 9/1987 | Riml | 180/9.5 X |

FOREIGN PATENT DOCUMENTS 2534726  8/1975  Fed. Rep. of Germany ....... 180/9.5

OTHER PUBLICATIONS

Advertising Document Ref: DTS35F from Poclain Hydraulics of France, Published circa Nov. 1986.

Primary Examiner—James B. Marbert
Assistant Examiner—Russell D. Stormer
Attorney, Agent, or Firm—Charles E. Lanchantin, Jr.

[57] ABSTRACT

A vehicle such as a combine harvester or the like includes a main frame, a track roller frame pivotally connected to the main frame, a drive wheel including a hydraulic drive motor having a housing and a rotatable shaft assembly, and an equalizer bar connected in a first embodiment to the shaft assembly by a coupling device including an anti-friction bearing and a trunnion member having a pair of pivot pins arranged along a substantially horizontal and longitudinally extending axis. In a second embodiment the equalizer bar is connected to the housing by another coupling device including a trunnion member having a pair of similarly oriented pivot pins. In each instance the transversely oriented equalizer bar is arranged along the transversely oriented central axis of the drive wheel, which provides a very stable 3-point frame suspension that is also rugged and economical and has a minimal tendency to collect mud or debris on the upper surfaces thereof in use.

27 Claims, 7 Drawing Sheets

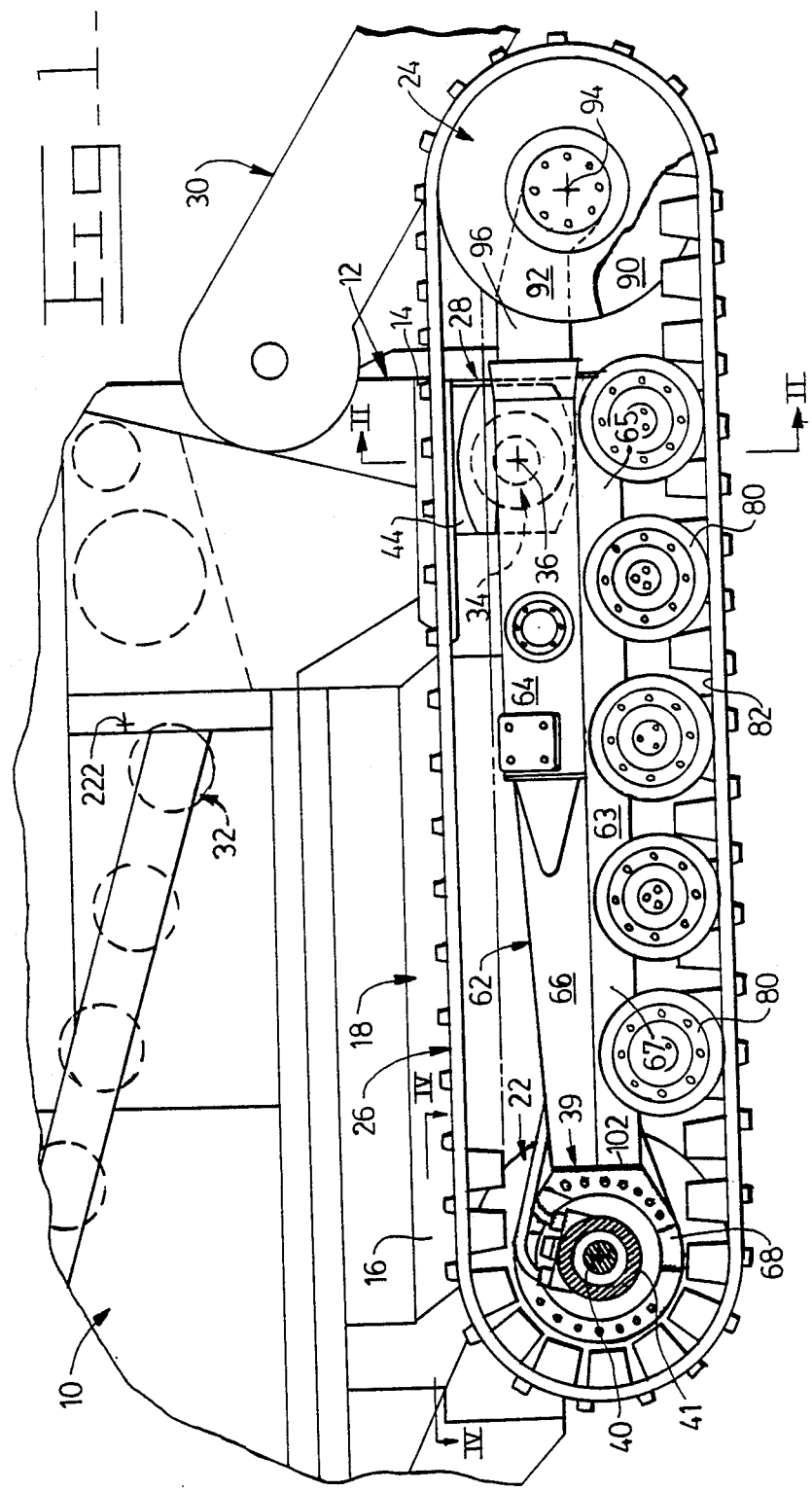

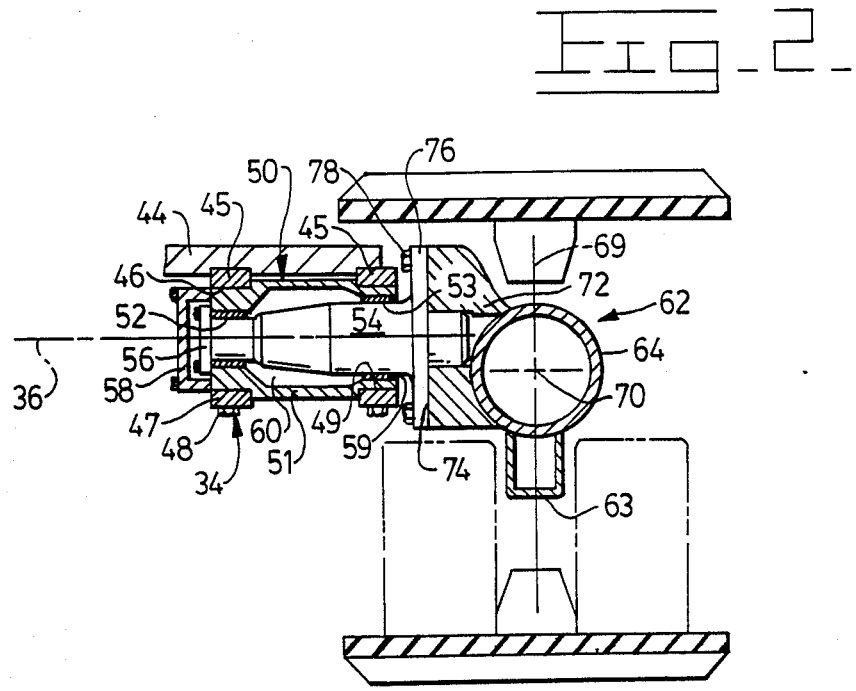
Fig_2_
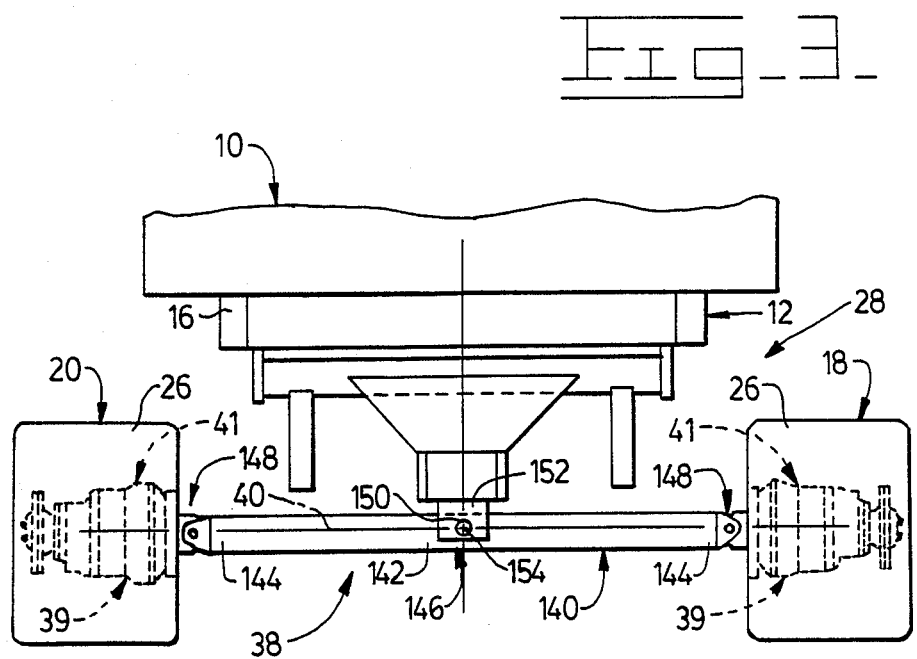
Fig_3_

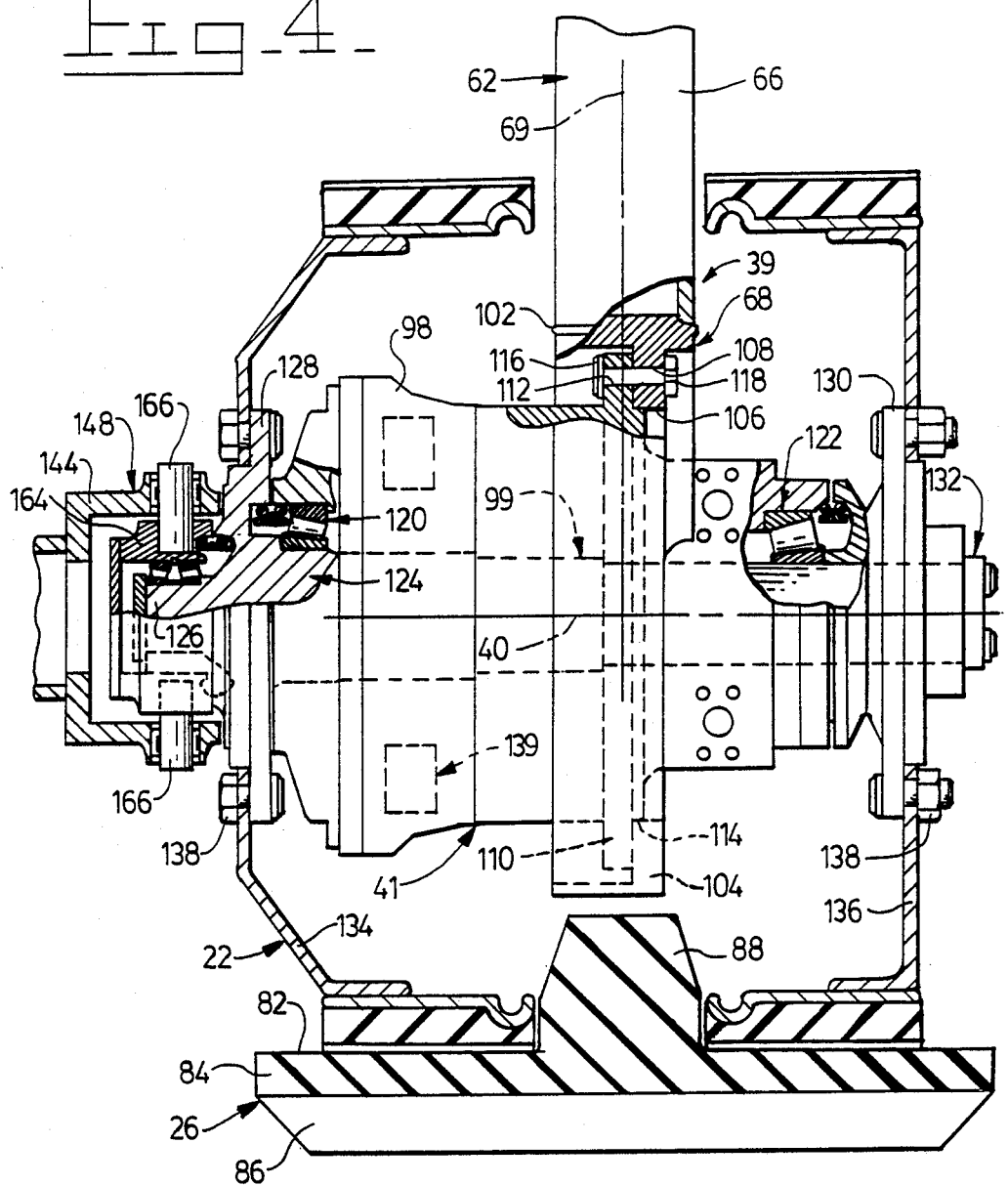

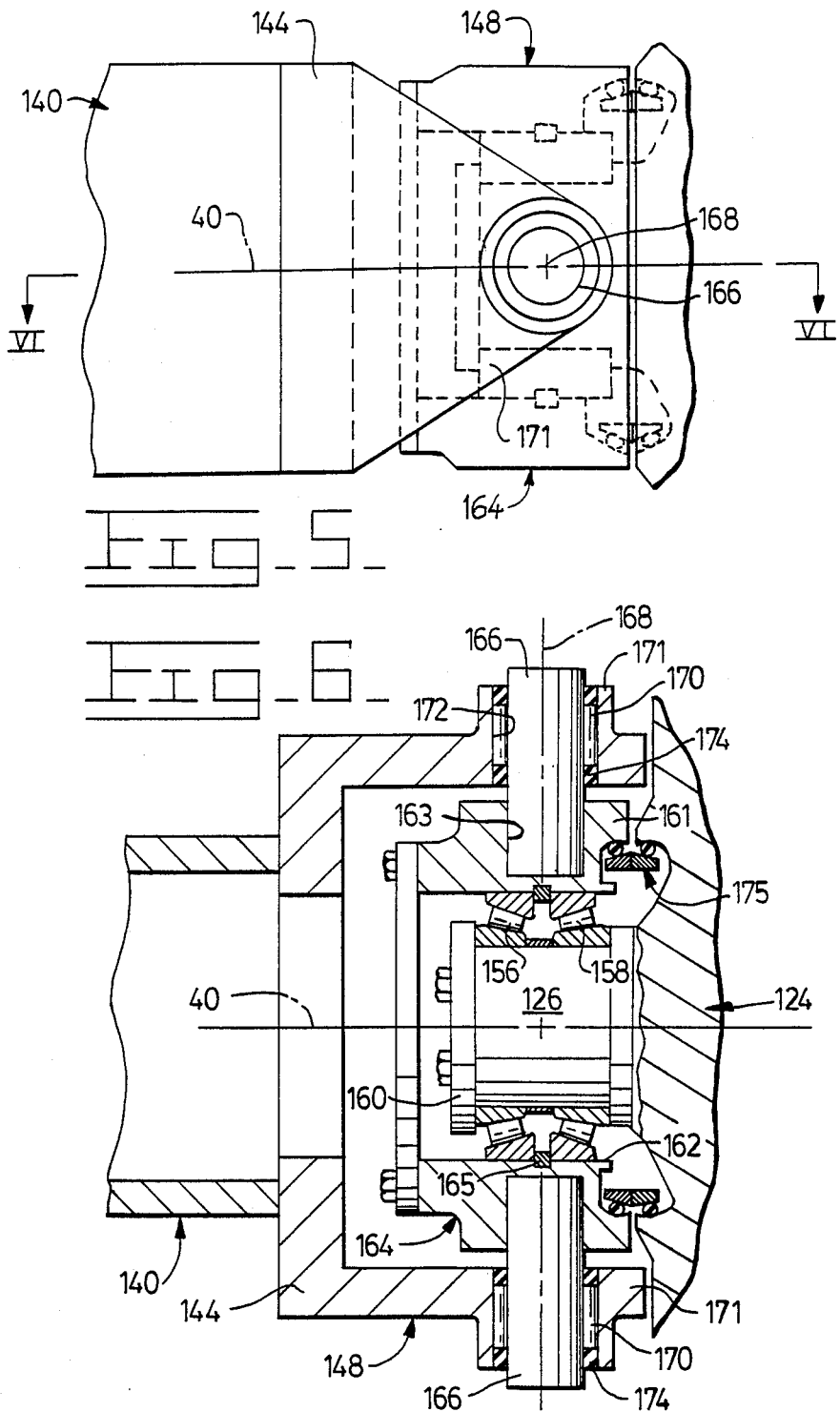

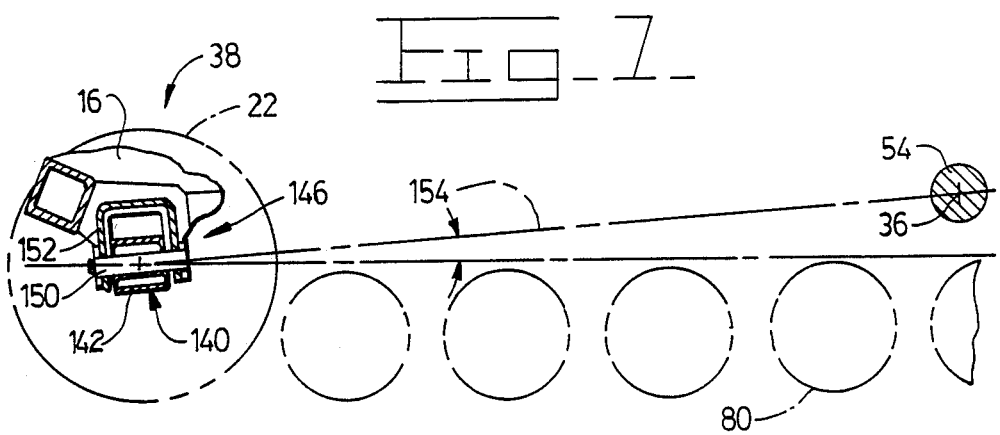
Fig_7_
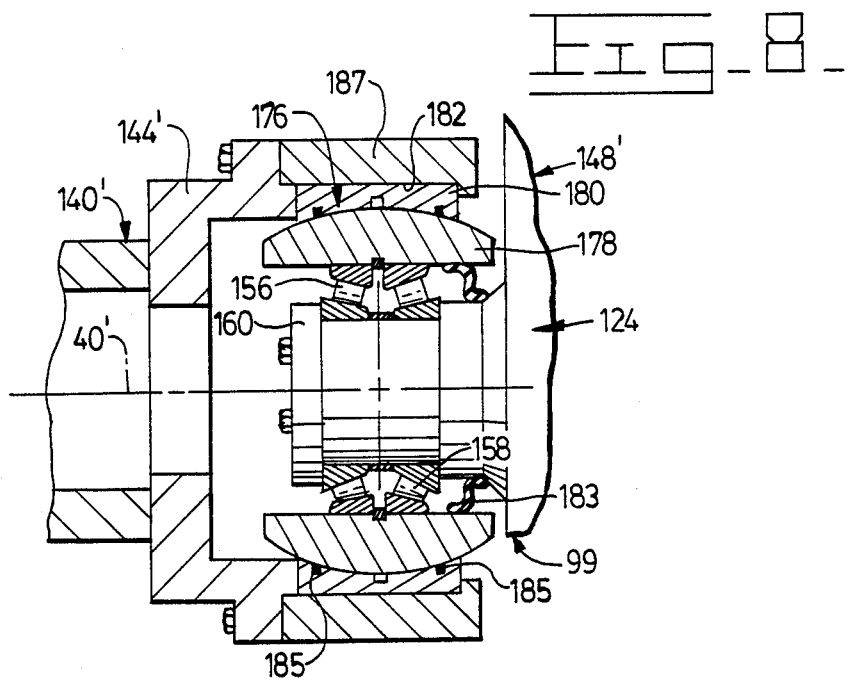
Fig_8_

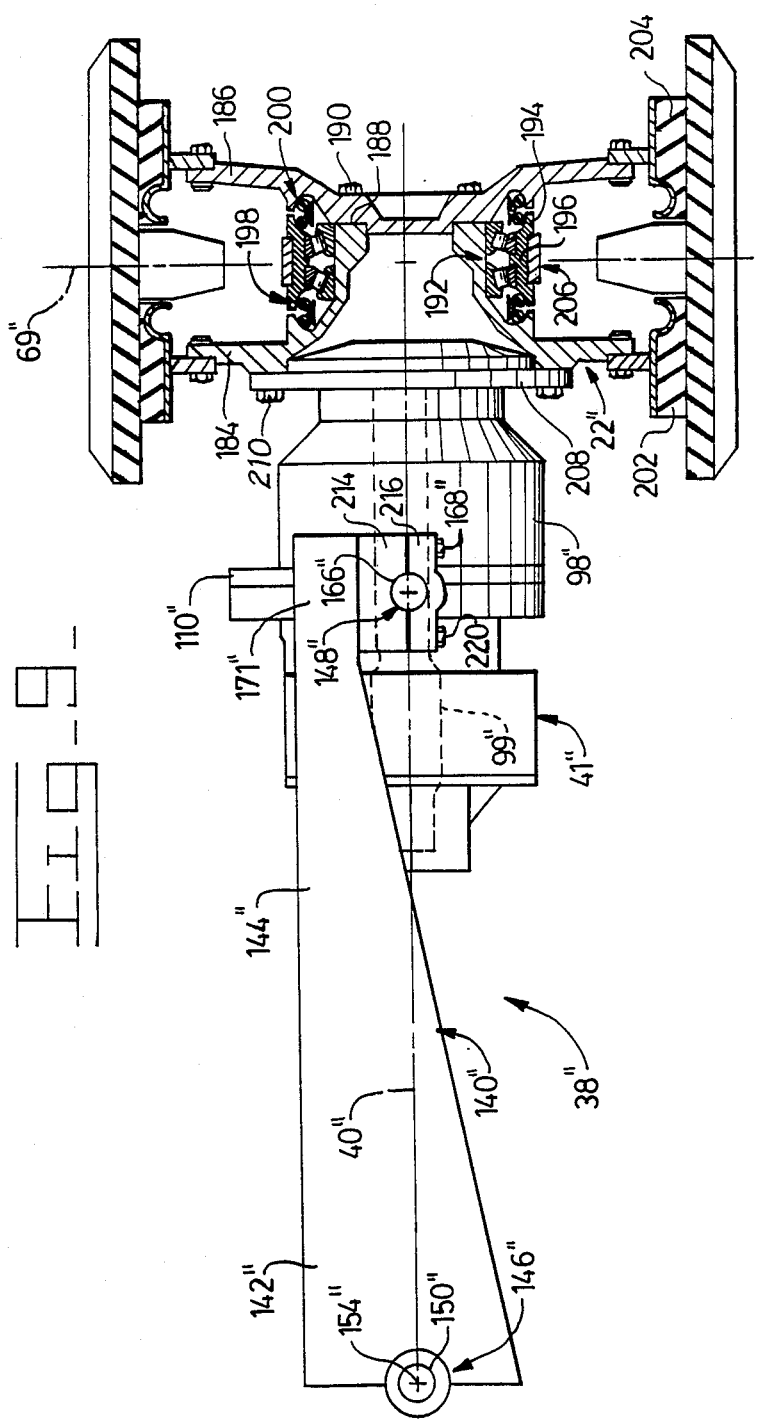

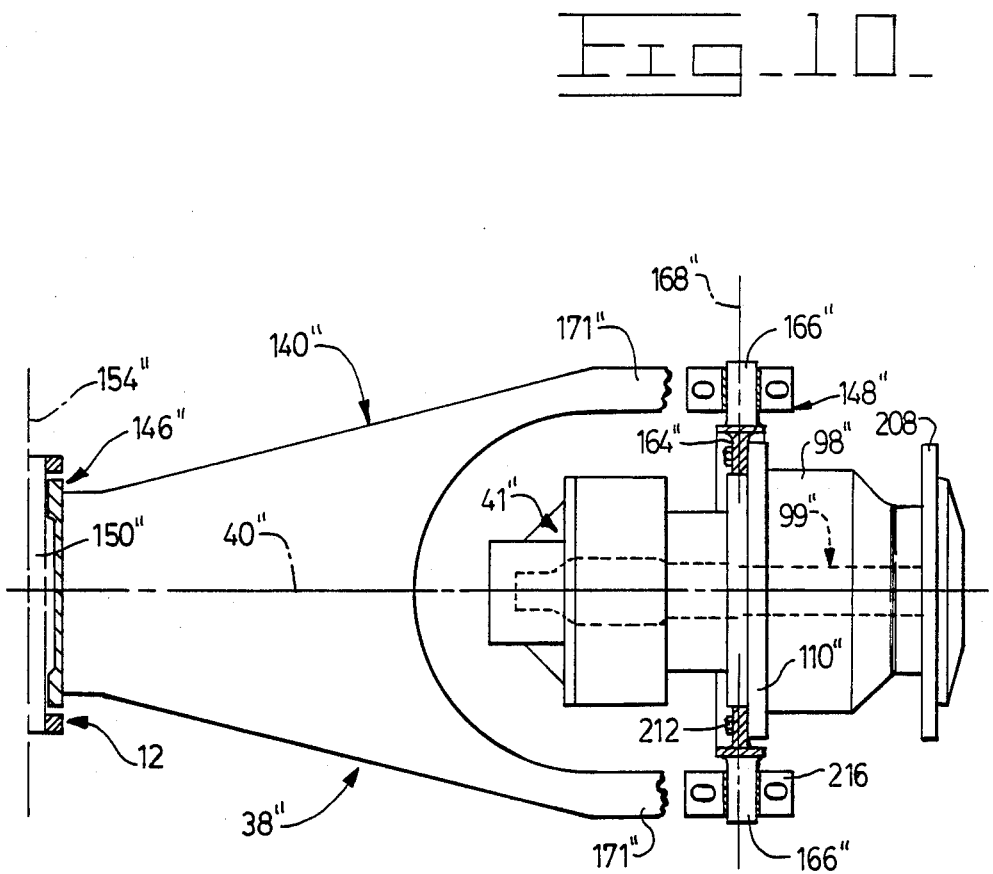

SUSPENSION STRUCTURE FOR A TRACKED VEHICLE

DESCRIPTION

1. This invention relates generally to a tracked vehicle such as a combine harvester, earthmoving machine or the like, and more particularly to the suspension structure therefor.

2. Background Art

Track-type undercarriages, such as those individually having either a track chain or an elastomeric belt entrained about a rear driving wheel and a front idler wheel, are known to exhibit markedly superior performance characteristics in certain respects over wheel suspension systems. These track-type undercarriages provide reduced ground pressure per unit area of contact and increased traction. Moreover, uneven and soft terrain vehicles equipped with track-type undercarriages have improved flotation and stability, and are more efficient than wheeled vehicles.

Most crawler tractors have two track-type undercarriages which are pivotally mounted on aligned shafts to the rear of the main frame and which are adapted to limitedly swing in vertical, longitudinally oriented planes. Oscillation of the undercarriages is desirable to accommodate surface irregularities and to reduce shock loads, and the front portions thereof are often interconnected by an equalizer bar or generally equivalent leaf spring assembly which is centrally connected to the main frame. Exemplifying the art in this 3-point main frame suspension area are: U.S. Pat. No. 1,522,157 issued to J. J. Tracey, et al on Jan. 6, 1925; U.S. Pat. No. 2,786,724 issued to R. Q. Armington, et al on Mar. 26, 1957; U.S. Pat. No. 2,988,159 issued to F. Weber on June 13, 1961; U.S. Pat. No. 3,889,769 issued to G. D. Blomstrom, et al on June 17, 1975; U.S. Pat. No. 3,974,891 issued to J. E. Persson on Aug. 17, 1976; U.S. Pat. No. 4,226,293 issued to R. D. Bieker on Oct. 7, 1980; U.S. Pat. No. 4,324,303 issued to D. J. Balzer on Apr. 13, 1982; U.S. Pat. No. 4,364,443 issued to Y. Sato on Dec. 21, 1982, et al; and U.S. Pat. No. 4,483,406 issued to J.J. Smith on Nov. 20, 1984

The aforementioned patents are generally illustrative of the large number of coupling devices that have been proposed for connecting the equalizer bar to both undercarriages and to the main frame of the vehicle in order to accommodate the tendency of the distal ends of the undercarriages to pull inwardly towards each other during oscillation. In addition to accommodating such compound angular misalignment of the undercarriages, it is often desirable to avoid the complexities of providing a fixed-axis power transfer mechanism for driving one of the pairs of wheels. Historically, the undercarriages have been mounted on the main frame for pivotal movement about the transverse axis of the rear drive wheels. But, it has been found that when large implement forces are imposed on the bearings of the rear drive wheels, such as are encountered when using a bulldozer blade, there is a marked decrease in the service life of the bearings and associated elements. Accordingly, the undercarriages have been pivoted on shafts located typically forwardly of the fixed axis of the rear drive wheels so that operating forces on the undercarriages and on the implement can be directed thereto independent of the rear drive wheels.

If the rear drive wheels are mounted on the undercarriages to the rear of the undercarriage pivot axes, the rear driver wheel axes travel in arcuate paths with oscillation of the respective undercarriage. This adds considerable cost and complexity to the usual mechanical drive trains powering the rear drive wheels.

In one track-type suspension structure specifically adapted to a combine harvester, each of the tracked undercarriages was pivotally connected to the main frame immediately behind the front idler wheel. An equalizer bar was connected to the main frame by a centrally disposed and longitudinally oriented pivot pin, and each one of the distal ends of the equalizer bar was connected to an inside support device in the form of an elongate box beam which extended rearwardly from the rear inside surface of each undercarriage track roller frame. A hydraulic motor was supported by each of these beams along the transverse axes of the rear wheels for powerably driving them, and this was an advantage since the drive train was simplified thereat. While such structure provided excellent stability and performed its 3-point main frame suspension extremely well, it exhibited several deficiencies. For example, the hydraulic drive motors extended laterally inwardly of the respective rear wheels and laterally inwardly of the tracks so that the motors were more susceptible to possible damage. Moreover, the inner supporting beams and the drive motors formed a platform that tended to collect mud and debris during operation of the combine harvester. Furthermore, the beams and the drive motors consumed too much space and located the equalizer bar too far to the rear of the combine harvester. And lastly, the heavy suspension structure was excessively costly and complex in its construction.

Another feature of the suspension structure discussed immediately above was that it incorporated elastomeric drive belts, rather than the usual multi-jointed metallic track chains, which were driven solely through friction by rear drive wheels having laterally inner and outer wheel portions. These drive wheel portions were spaced apart to receive guide members which extended radially inwardly from the drive belt, and were spaced apart to receive direct support from the track roller frame along the longitudinal central plane thereof. In such construction the axes of the drive wheels were maintained in a horizontal and substantially transverse attitude during oscillation of the track roller frames, and this is considered highly desirable in that the longitudinal orientation of the drive belts is maintained and side drifting of the drive belts is minimized.

Therefore, what is desired is a track-type suspension structure for a vehicle such as a combine harvester or the like that is rugged and economical, that does not incorporate a costly and heavy rearwardly extending beam structure, that has minimal tendency to collect debris, that preferably supports each of the hydraulic drive motors in relatively protected locations, and that locates the equalizer bar in a more favorable longitudinal location to match the 3-point main frame suspension requirements with overall compactness of structure. Furthermore, the couplings that are used to connect the outer ends of the equalizer bar to the undercarriages should be so constructed and arranged as to be compatible with the drive motors and drive wheels, while simultaneously allowing the central axes of the drive wheels to be maintained in substantially horizontal and transverse orientations for precise alignment of the drive belt.

The present invention is directed to overcoming one or more of the above problems.

DISCLOSURE OF THE INVENTION

In one aspect of the invention there is provided a suspension structure for a vehicle including a main frame, a track-type undercarriage having a track roller frame, and pivot means for connecting the track roller frame to the main frame for pivotal movement of the track roller frame about a first axis. The undercarriage includes a wheel having inner and outer wheel portions, and support means for connecting the wheel to the track roller frame for rotation about a second axis. And, advantageously, a pivoting support apparatus is provided including a cross member having a central portion and distal ends, first coupling means for pivotally connecting the central portion to the main frame, and second coupling means for coupling one of the distal ends of the cross member to the wheel substantially along the second axis while permitting the second axis to remain substantially parallel with the first axis. Preferably, these axes are all maintained in substantially horizontal planes transversely to a longitudinal vertical plane disposed centrally through the vehicle.

In another aspect of the invention, a suspension structure is provided for a vehicle having a main frame, a track roller frame pivotally connected to the main frame, a wheel having a housing and a shaft assembly therewithin, and support means for connecting the housing to the track roller frame and permitting the shaft assembly to rotate about a transversely oriented horizontal axis. The suspension structure further includes a cross member, first coupling means for pivotally connecting the midpoint of the cross member to the main frame, and second coupling means for pivotally connecting the distal end of the cross member to the rotatable shaft assembly along the axis.

More specifically, and in a further aspect of the invention, a drive wheel has a housing centrally connected to a track roller frame, a shaft assembly rotatably mounted in the housing, and the distal end of an equalizer bar incorporates a coupling connected to the rotatable shaft assembly along the axis thereof. Such coupling can include a bearing exteriorly supported o the shaft assembly and a trunnion mounted on that bearing and supporting a pair of pivot pins whose aligned axes are oriented horizontally in a longitudinal plane. Alternatively, spherical bearing members can be mounted on that bearing to support the end of the equalizer bar. Moreover, a radial piston type hydraulic drive motor is preferably incorporated within the housing to powerably and controllably rotate the shaft assembly.

In a still further aspect of the invention, a drive wheel has a drive motor shaft assembly rotatably secured thereto along the axis thereof, and the housing of the drive motor is connected to the distal end of an equalizer bar through a coupling arranged on the transverse drive wheel axis. In this instance the coupling also includes a trunnion having a pair of pivot pins secured thereto whose aligned axes are oriented horizontally in a longitudinal plane, and with the trunnion being secured to the motor housing.

BRIEF DESCRIPTION OF THE DRAWINGS

FIG. 1 is a diagrammatic, fragmentary, right side elevational view of a combine harvester employing a suspension structure for connecting a track-type undercarriage to the main frame in accordance with the present invention, and with portions of the front and rear wheels broken away to better show details of construction thereof;

FIG. 2 is a diagrammatic and enlarged cross sectional view through the front pivot portion of the right-hand undercarriage as taken along the line II—II of FIG. 1, with portions thereof shown in phantom lines for convenience;

FIG. 3 is a diagrammatic rear end view of the combine harvester illustrated in FIG. 1 showing only the equalizer bar and the couplings associated therewith;

FIG. 4 is a diagrammatic and enlarged fragmentary top plan view of the suspension structure at the right rear drive wheel with portions thereof illustrated in cross section, and as taken generally along line IV—IV of FIG. 1;

FIG. 5 is a diagrammatic and further enlarged fragmentary rear elevational view of the coupling means shown in FIG. 3 at the outer end of the equalizer bar;

FIG. 6 is a diagrammatic, fragmentary, and cross sectional view of the coupling means illustrated in FIG. 5 as taken along line VI—VI thereof;

FIG. 7 is a diagrammatic side elevational view of a fragmentary portion of the central rear coupling device shown in FIG. 3, illustrating the elevationally inclined disposition thereof relative to the front pivot axis of the undercarriages;

FIG. 8 is a fragmentary, cross sectional view of a first alternate embodiment coupling means at the distal end of the equalizer bar;

FIG. 9 is a diagrammatic, rear end view of a second alternate embodiment coupling means between the right distal end of an equalizer bar and the right rear wheel and with the drive belt and rear wheel shown in vertical cross section; and FIG. 10 is a diagrammatic, top plan view of the second alternate embodiment coupling means illustrated in FIG. 9 with certain portions broken away to show details of construction thereof, and with the drive belt and the major portion of the wheel omitted for convenience.

BEST MODE FOR CARRYING OUT THE INVENTION

Referring to FIG. 1, there is shown the lower portion of a combine harvester vehicle 10 having a longitudinally extending main frame 12 with a first end or front end 14 and a second end or rear end 16 located respectively to the right and left when viewing the drawing. Right hand and left hand track-type undercarriages 18 and 20 are located generally elevationally below the main frame and provide the sole support for the superstructure of the vehicle as can also be visualized by reference to FIG. 3. These undercarriages are essentially mirror images of each other, and each one includes a rear drive wheel 22 and a front idler wheel 24. A ground-engaging track or drive belt 26 encircles these wheels in the form of an endless loop in a well-known manner. In accordance with the present invention, a track-type suspension structure 28 provides the 3-point support for the combine harvester 10 and permits the harvesting of crops such as sugar cane, vegetables, rice and grains in predominantly soft and wet ground conditions. A conventional front-mounted harvesting implement 30, only a fragment of which is illustrated, is effective to gather the crop with forward movement of the vehicle and to urge it upwardly and rearwardly through the centrally located throat of a conventional threshing mechanism indicated only generally in FIG. 1 by the broken lines at reference number 32. It is to be understood that the harvesting mechanism itself could be of any suitable form, and that the depiction of the present invention within the context of a combine harvester is for purposes of example only, the invention also being adaptable to other forms of track-type vehicles and other implements.

The suspension structure 28 includes pivot means or a pair of laterally separated pivot joints 34 as shown in FIGS. 1 and 2 for pivotally connecting the undercarriages 18 and 20 supportably to the front end 14 of the main frame 12 and permitting pivotal movement of the undercarriages about a common horizontal and transversely oriented first axis or pivot axis 36. And at the rear end 16 of the main frame, as is shown in FIGS. 3-6, the suspension structure 28 includes a transversely extending and centrally pivoting support apparatus 38 for supporting the rear end of the main frame on the undercarriages, preventing uncontrolled lateral spreading of the undercarriages, and transferring side forces laterally between the undercarriages. The rear portion of the suspension structure further includes wheel support means or a supporting device 39 for connecting each one of the rear wheels 22 to the respective undercarriage for rotation about its own horizontal and transversely oriented second axis 40 as can be best appreciated by reference to FIG. 4. Preferably, each of the rear wheels includes drive means such as a hydraulic drive motor 41 for independently powerably rotating a portion thereof about its own second axis 40 as will be subsequently described.

More specifically, the representative front pivot joint 34 illustrated in FIGS. 1 and 2 includes a depending bracket 44 which is releasably secured to the front end 14 of the main frame 12. The bracket supports a pair of depending support blocks 45, with each block defining a downwardly facing semi-cylindrical internal surface or pocket 46. A pair of retention caps 47 are releasably secured to these blocks by a plurality of upwardly extending fasteners or bolts 48. Each of the retention caps defines an upwardly facing semi-cylindrical internal surface or pocket 49, so that the blocks and caps are adaptable to releasably clamp a stepped tubular housing 50 between them. The tubular housing has a raised rib 51 centrally therearound which is axially entrapped between the blocks and caps, and the tubular housing contains inboard and outboard sleeve bearings 52 and 53. A stepped and generally cylindrical stubshaft 54 is supported for pivotal movement about the axis 36 in these sleeve bearings and has an end retention cap 56 which is releasably secured to the inner end of the stubshaft for restricting lateral motion therebetween. A cover 58 is releasably secured to the inner end of the tubular housing 50, and an annular seal ring 59 is disposed between the outer end of the tubular housing and the stubshaft for containing a lubricant within an enclosed chamber 60 defined thereby. Because the opposite pivot joints 34 are transversely separated, additional space is provided that can be utilized for greater ground clearance or for components mounted on the vehicle such as the centrally located throat of the threshing mechanism 32.

As is shown in FIGS. 1, 2 and 4, the right-hand undercarriage 18 includes an elongate track roller frame 62 defined primarily by an elongate channel-shaped base 63, a tubular casing 64 overlyingly connected to a front end 65 of the base, an inverted U-shaped beam or box beam transition structure 66 overlyingly connected to a rear end 67 of the base, and a wheel-supporting collar 68 connected to the rear end of the base and the transition structure. Preferably, these major portions are weldably secured together and are generally arranged along a longitudinally oriented, vertical central plane 69 passing through a central axis 70 of the tubular casing 64. A support bracket 72 is rigidly secured to the tubular casing by welding or the like, and preferably defines a flat, vertically oriented, inside mounting surface 74 parallel to the central plane 69. A mounting plate 76 integrally secured to the stubshaft 54 is releasably secured to the mounting surface 74 by a plurality of threaded fasteners or bolts 78. These fasteners are disposed generally about the periphery of the mounting plate and extend therethrough, and are screwthreadably received in the support bracket 72.

As illustrated in FIG. 1, a plurality of roller wheels 80 are rotatably connected to the underside of the channel-shaped base 63, and run against a smooth inner surface 82 of the drive belt 26. A cross sectional view of the preferred endless drive belt is shown in FIG. 4, and this view illustrates that the relatively flat elastomeric body 84 thereof has a plurality of externally located ground-engaging bars 86 and a plurality of internally located guide members 88 integrally formed therewith. The drive belt is preferably reinforced by internal cables or the like, not illustrated, so that it is substantially inextensible. It is to be appreciated that a multi-jointed metallic track chain could also be used without departing from the spirit of the present invention, and that the term "ground-engaging track" as used herein can include either an elastomeric drive belt of the preferred type illustrated or a metallic track chain such as has been used in the earthmoving industry for many years, although not shown.

In order to apply proper tension to the drive belt 26 and to allow obstacles in the path of the vehicle to be traversed with minimum shock to the undercarriage 18, the front idler wheel 24 shown in FIG. 1, including inner and outer wheel portions 90 and 92, is supported for rotation about a transverse third axis 94 by a carrier 96 telescopically received in the tubular casing 64 and centrally disposed laterally between the wheel portions. The carrier 96 is continually urged to the right when viewing FIG. 1 by a resiliently loaded recoil mechanism of any conventional construction located generally within the tubular casing, and not shown for convenience.

As is illustrated in FIG. 4, the rear wheel 22 incorporates the hydraulic drive motor 41 as a major structural element thereof. The drive motor includes a generally tubular housing 98 and a shaft assembly 99 rotatably supported therewithin. The wheel supporting device 39 includes the supporting collar 68 which is preferably rigidly secured to the upper transition structure 66 and lower base 63 by a welded coupling joint 102 at the front face of the collar as can be appreciated by reference also to FIG. 1. On the one hand, the supporting collar has an internal mounting flange 104 which defines a cylindrical pilot bore 106 therethrough generally concentrically arranged with the second axis 40, and a plurality of cylindrical passages 108 therethrough. On the other hand, the housing 98 has an external mounting flange 110 defining a plurality of cylindrical passages 112 therethrough, and an external cylindrical pilot portion 114 which is insertable in the pilot bore 106. A plurality of fluted studs 116 are rigidly secured in the passages 112 of the mounting flange 110 which extend laterally outwardly through the passages 108, and a plurality of retaining nuts 118 are screwthreadably installed thereon in order to releasably couple the housing 98 to the collar 68. Advantageously, the motor mounting flange 110 is arranged generally centrally of the drive motor 41, and substantially on the central plane 69 when installed on the collar.

The shaft assembly 99 is rotatably powered by the hydraulic drive motor 41 and is supported within the housing 98 by an inboard tapered roller bearing 120 and an outboard tapered roller bearing 122 laterally spaced on each side of the central plane 69. The shaft assembly includes an output shaft 124 defining a cylindrical inner end portion 126 and an inboard annular flange 128, and an outboard annular flange 130 is nonrotatably secured to the shaft and is releasably connected thereto by a conventional outboard retention device 132. FIG. 4 also shows that the wheel 22 has an inner wheel portion 134 and an outer wheel portion 136 which are releasably secured to the inboard and outboard flanges 128 and 130 respectively by a plurality of threaded fastener devices 138 of the usual stud and nut type.

Each of the hydraulic drive motors 41 has a dual displacement capability so that they are individually capable of providing two speed ranges. Preferably, each one is of the reversible radial piston type having a plurality of rollers that roll on a plurality of exterior cams as is known in the art, although not illustrated. Such motors are, for example, commercially produced by Poclain Hydraulics of France and are highly efficient in producing high torque either in a low speed range or a high speed range. In order to obtain the high range and to increase the output speed, the pressure supply to half the pistons is bypassed through a suitable control assembly, not illustrated. The motors also preferably include an auxiliary disc-type parking brake 139 between the housing 98 and the shaft assembly 99 of conventional construction.

Referring to FIG. 3, the pivoting support apparatus 38 can be noted to include a cross member or equalizer bar 140 having a midpoint or central portion 142 and laterally opposite distal ends 144. The term cross member as used herein is meant to include a solid metal bar, a fabricated bar of tubular cross section, or even an equivalent leaf spring assembly, although the latter is not illustrated herein. Advantageously, first coupling means or a first coupling device 146 is provided for pivotally connecting the central portion of the equalizer bar to the rear end 16 of the main frame 12, and second coupling means or a second coupling device 148 is provided for coupling each of the distal ends 144 to the respective one of the rear wheels 22 substantially along the second transverse axis 40.

More specifically, as can be noted by reference to FIGS. 3 and 7, the first coupling device 146 includes a cylindrically-shaped pivot pin 150 which is non-rotatably secured to a downwardly facing U-shaped bracket or saddle 152 connected to the rear end 16 of the main frame 12. The pivot pin has a central axis 154 which preferably extends longitudinally and upwardly at a slight angle, for example about 4°, to a point of intersection with the front pivot axis 36. This is because the pivot pin 150 is elevationally located substantially on the second axis 40 of the rear drive wheels 22, and the elevation of the aligned pivot axes 36 is slightly above that of the aligned second axes 40 when the vehicle is disposed on a horizontal plane.

Since the equalizer bar 140 is adapted to pivot on the pivot pin 150, the distal ends 144 thereof travel in arcuate paths as the vehicle 10 traverses uneven terrain. Accordingly, each of the second coupling devices 148 is constructed for universal connection to the shaft 124 of the wheels 22 as can best be appreciated by reference to FIGS. 5 and 6. Particularly, two tapered roller bearings 156 and 158 are internally seated on the cylindrical inner end portion 126 of the rotatable shaft 124 in opposing relation and are secured in place by a releasable thrust-transmitting retaining plate 160. The anti-friction type roller bearings are externally seated in a cylindrical bore 162 of a trunnion member 164, and are individually adapted to engage a thrust ring 165 located between them in order to transmit thrust forces along axis 40 between the trunnion member and the shaft. The trunnion member 164 includes an annular body 161 defining a pair of blind cylindrical bores 163, and a pair of oppositely extending pivot pins 166 are pressed into the bores and arranged along a generally horizontal common axis 168 disposed in a longitudinally oriented vertical plane. Preferably, however, the axes 168 is parallel with the slightly upwardly inclined axis 154 of the equalizer bar pivot pin 150. The equalizer bar 140 has a rectangular box beam cross section and the distal ends 144 thereof define bifurcated arms 171 to receive the pivot pins 166. Opposite sleeve or needle bearings 170 are received in aligned cylindrical bores 172 formed in the arms, and these bearings rotatably engage the pivot pins. The axis 168 of the pivot pins intersects the transverse axis 40. Also, a conventional seal ring 174 is disposed at each end of the bearings 170, and a conventional seal assembly 175 located between the shaft and the trunnion member 164 contains lubricant for the tapered roller bearings 156 and 158.

First Alternate Embodiment

While the rotary trunnion coupling device 148 shown in FIGS. 5 and 6 is preferred because it is less costly to manufacture and is easier to seal, the alternate coupling device 148′ shown in FIG. 8 is desirable because of its overall simplicity and compactness.

Because the shaft 124 rotates at the speed of the rear wheel 22, the back-to-back tapered roller bearings 156 and 158 of the coupling device 148 are utilized also in the coupling device 148′. Externally thereof, however, the coupling device 148′ includes a spherical bearing assembly 176 having an inner spherical bearing member 178 and an outer spherically socketed bearing member 180. The outer bearing member is secured in a cylindrical bore 182 of a retaining ring 187 releasably secured to the distal end 144′ of the equalizer bar 140′. A seal ring 183 is provided between the spherical bearing member 178 and the shaft 124, and another pair of seal rings 185 are seated in the outer bearing member 180 and engaged with the inner bearing member 178.

Second Alternate Embodiment

A second alternate embodiment pivoting support apparatus 38″ is shown in FIGS. 9 and 10. In this construction, the rear wheel 22″ has an axially inner carrier member or hub 184 and an axially outer carrier member or hub 186 connected together at a separation joint 188 by a plurality of threaded fasteners or bolts 190. Two tapered roller bearings identified generally by the reference number 192 are seated in opposing relation on the inner carrier member, and a support band 194 embracingly encircles the juxtaposed roller bearings. The support band has a radially inwardly extending annular web 196 which is disposed between the roller bearings for transmitting thrust forces from the wheel into the support band. A pair of seal ring assemblies 198 and 200 are disposed between the respective carrier members 184 and 186 and the support band 194 to contain lubricant for the roller bearings. Furthermore, the rear wheel 22" includes an inner wheel portion 202 and an outer wheel portion 204 which are releasably connected to the respective carrier members 184 and 186, and support means or a supporting device 206 releasably encircles and clamps the support band 194 to a slightly modified track roller frame 62", not shown. Although not illustrated in detail, the supporting device 206 is like a split collar including a front part defining a semi-cylindrical pocket and which is secured to the rear portion of the roller frame, a rear C-shaped retention cap defining a comparable semi-cylindrical pocket, and fastening means for releasably connecting them together in encircling engagement with the support band 194.

The hydraulic drive motor 41" shown in FIGS. 9 and 10 has a housing 98" defining an external mounting flange 110" located laterally inwardly of the wheel 22". Also, the drive motor has a rotatably powered shaft assembly 99" including an output flange 208 which is releasably secured to the inner carrier member 184 by a plurality of threaded fasteners or bolts 210. And, the equalizer bar 140" is connected to the housing 98" of the drive motor 41" by a modified second coupling device 148" including a trunnion member 164" releasably connected to the motor mounting flange 110" by a plurality of threaded fasteners 212. The trunnion member 164" includes a pair of oppositely extending pivot pins 166" arranged along a generally horizontal common axis 168" disposed in a longitudinally oriented vertical plane. Like the first embodiment, the axes 154" and 168" are slightly upwardly inclined when the front pivot axis 36 is elevated above the horizontal transverse axis 40" of the wheel 22" as can be appreciated by reference to FIG. 7. The pivot pins 166" are individually rotatably received within a pair of opposing pillow blocks 214 and 216 secured to the bifurcated distal arms 171" of the equalizer bar 140". In this instance, the upper pillow blocks 214 are integrally secured to the underside of the equalizer bar arms 171", and the lower pillow blocks or caps 216 are releasably secured to the upper pillow blocks by conventional screwthreaded fasteners 220.

Industrial Applicability

In operation, the vehicle 10 can be driven in a straight-ahead mode wherein the opposite output shaft assemblies 99 are selectively driven at identical speeds by the rearwardly disposed hydraulic drive motors 41 at any ground speed within a low working speed range or within a relatively faster traveling speed range. In order to steer the vehicle an associated steering wheel, not shown, can be rotated in the desired direction and to the desired angular degree to reflect a speed difference between the opposite drive motors proportionate to the desired turn. Since one drive motor can be selectively hydraulically locked or even controllably reversed in rotational direction while the opposite drive motor is rotating in the forward direction, a compact pivot turn can be easily achieved. At any time the auxiliary brakes 139 within the hydraulic drive motors may be simultaneously applied to retard or to stop the shaft assemblies 99.

As can be visualized by reference to FIGS. 1 and 3, when the vehicle 10 travels over uneven terrain the rearward end of the right undercarriage 18 can swing downwardly about its front pivot axis 36 while the rearward end of the left undercarriage 20 swings upwardly about its front pivot axis 36 due to their connections to the opposite ends of the centrally pivoted equalizer bar 140. As the undercarriages swing in opposite directions, the equalizer bar will pivot about the central pivot pin 150 and cause the axes 168 of the left and right pivot pins 166 shown in FIGS. 5 and 6 to travel in slightly arcuate paths about the central axis 154. But since the axis 40 of each drive wheel 22 is both longitudinally located and elevationally located to extend substantially through the axis 154 when the vehicle is on a horizontal plane, laterally inward travel of each of the axes 168 and associated drive wheels and the rear portion of each undercarriage is minimal as the rear portions of the undercarriages travel above and below the horizontal level. Furthermore, the central coupling device 146 and the outer coupling devices 148 cooperatively act together on the undercarriages while permitting the supporting devices 39 or 206 to maintain the drive wheel axes 40 substantially parallel with the first axis 36.

The track roller frame 62, front and rear wheels 24 and 22, and the track belt 26 at one side of the vehicle 10 can be very simply removed as a unit from the main frame 12. It is only necessary to place a support such as an adjustable jack, not illustrated, under the front end 14 of the main frame to enable the pivot joint 34 shown in FIG. 2 to be uncoupled. Fasteners 48 are screwthreadably released to allow the lower retention caps 47 to be disconnected from the upper support blocks 45. Advantageously, the tubular housing 50 and the stub-shaft 54 can thereafter be moved laterally away from the main frame without any lubricating fluid escaping from the pivot joint.

Another support, not illustrated, can be placed under the rear end 16 of the main frame 12 to permit the second coupling device 148 shown in FIG. 6 to be uncoupled. This can be easily accomplished by pulling the pivot pins 166 respectively forwardly and rearwardly out of the blind bores 163 provided in the trunnion body 161. This frees the trunnion body, the shaft 124, the drive motor 41, and the entire track roller frame 62 from the equalizer bar 140 and the main frame.

The alternate coupling means 148' shown in FIG. 8 can likewise be disassembled relatively conveniently by releasing the retaining ring 187 from the distal end 144' of the equalizer bar 140'. In this way the entire spherical bearing assembly 176 can be moved laterally outwardly with the shaft 124.

Disassembling the coupling means 148" of FIGS. 9 and 10 is achieved by screwthreadably loosening the fasteners or bolts 220 and removing the lower pillow blocks 216 from the upper pillow blocks 214. This frees the trunnion member 164" and the drive motor 41" from the equalizer bar 140". In order to accommodate for the swinging movement of the track roller frames 62", the pivot pins 166" are permitted to slide a relatively limited distance forwardly and rearwardly within the pillow blocks, and the equalizer bar 140" is permitted to slide longitudinally along the central pivot pin 150". In the embodiment of FIGS. 1-6, longitudinal sliding movement of the same basic type is allowed at the central coupling device 146" and at the outer coupling device 148". With the construction of FIGS. 9 and 10, however, the rotational torque about the axis 40" due to the hydraulic drive motor 41" is transmitted through the pivot pins 166" to the equalizer bar 140" and to the central pivot pin 150". On the other hand, in the embodiment of FIGS. 1–7 the torque of the drive motor 41 about axis 40 is directed into the track roller frame 62 through the supporting collar 100.

In view of the foregoing, it is apparent that the suspension structure 28 of the present invention is simple and rugged in construction, and very economical. As is shown in FIG. 4, the hydraulic drive motor 41 is centrally mounted on the track roller frame 62 in a protected location laterally within the width envelope of the drive belt 26 and generally within the inner and outer wheel portions 134 and 136. Thus, the drive motors are less susceptible to possible damage, and do not tend to collect debris. Moreover, the equalizer bar 140 is of a relatively small cross section and the second coupling device 148 is compact so that a minimal upper surface area is presented for the accumulation of debris.

In regard to the preferred central disposition of the drive motor 41 within the drive belt envelope, it can be appreciated from reference to FIGS. 1 and 4 that the tension loads on the drive belt 26 due to the carrier 96 being urged forwardly in a continuously resilient manner are directed relatively evenly through the inner and outer wheel portions 134 and 136 and to the shaft 124. Thereafter, these same forces are directed through the laterally separated inner and outer roller bearings 120 and 122 to the housing 98 and to the central mounting flange 110 in two relatively equivalent force-transmitting paths to the supporting collar 68. This is also very desirable.

In side elevation, as can be visualized with reference to FIGS. 1 and 7, the pivoting support apparatus 38 is located within the elevational profile of the drive belt so that the vehicle is extremely maneuverable in close quarters. The center of gravity 222 of the superstructure is longitudinally located above about the longitudinal center of the undercarriages 18 and 20 for relatively even ground pressure distribution by the drive belt. More than 50% of the weight of the superstructure is supported by the front pivot joints 34 in the embodiment illustrated since the pivot joints 34 are located longitudinally somewhat closer to the center of gravity than the rear pivoting support apparatus 38. This is desirable because in a combine harvester, the front end 14 of the main frame 12 is of more rugged construction. The remainder of the superstructure weight is supported by the equalizer bar with advantageously direct force paths to the opposite rear drive wheels.

Other aspects, objects and advantages of this invention can be obtained from a study of the drawings, the disclosures and the appended claims.

What is claimed is:

1. A suspension structure for a vehicle including a main frame, a track-type undercarriage having a track roller fame, and pivot means for connecting the track roller frame to the main frame for pivotal movement about a first axis, comprising:
   the undercarriage including a wheel having inner and outer wheel portions and support means extending between the wheel portions for connecting the wheel to the track roller frame for rotation about a second axis; and
   a pivoting support apparatus including a cross member having a central portion and opposite distal ends, first coupling means for pivotally connecting the central portion of the cross member to the main frame, and second coupling means for coupling one of the distal ends of the cross member to the wheel substantially along the second axis while permitting the support means to maintain the second axis substantially parallel with the first axis.

2. The suspension structure of claim 1 wherein the wheel includes a drive motor having a housing and wherein the support means releasably connects the housing to the track roller frame.

3. The suspension structure of claim 2 wherein the wheel includes a shaft assembly rotatably driven by the drive motor, and wherein the second coupling means is connected to the shaft assembly.

4. The suspension structure of claim 3 wherein the coupling means includes a bearing concentrically arranged on the shaft assembly along the second axis, and a trunnion member mounted on the bearing and having a pair of longitudinally extending pivot pins.

5. The suspension structure of claim 4 wherein the distal end of the cross member is bifurcated to pivotally receive the pivot pins.

6. The suspension structure of claim 1 wherein the second coupling means includes a trunnion member having a pair of longitudinally extending pivot pins, and the distal end of the cross member is bifurcated to pivotally receive the pins.

7. The suspension structure of claim 6 wherein the wheel includes a rotatable shaft assembly and the second coupling means includes bearing means concentrically arranged on the second axis for supporting the trunnion member on the rotatable shaft assembly.

8. The suspension structure of claim 7 including a drive motor having a housing and bearing means for rotatably supporting the shaft assembly within the housing, and wherein the support means includes means for releasably connecting the housing to the track roller frame.

9. The suspension structure of claim 6 wherein the wheel includes a drive motor having a housing, and the housing is connected to the trunnion.

10. The suspension structure of claim 1 wherein the wheel includes a shaft assembly and the second coupling means includes an anti-friction bearing connected to the shaft assembly, and a spherical bearing assembly connected between the anti-friction bearing assembly and the distal end of the cross member.

11. A suspension structure for a track-type vehicle having a main frame and a track roller frame pivotally connected to the main frame, comprising:
   a wheel having a housing and a shaft assembly rotatably supported therewithin, support means for connecting the housing to the track roller frame and permitting the shaft assembly to rotate about a substantially transversely oriented horizontal axis;
   a cross member;
   first coupling means for pivotally connecting the midpoint of the cross member to the main frame; and
   second coupling means for pivotally connecting the distal end of the cross member to the rotatable shaft assembly along the axis.

12. The suspension structure of claim 11 wherein the wheel includes drive motor means within the housing for powerably rotating the shaft assembly.

13. The suspension structure of claim 12 wherein the track roller frame has a vertical central plane extending longitudinally of the vehicle and the support means connects the housing to the track roller frame substantially on the central plane.

14. The suspension structure of claim 12 wherein the second coupling means includes an annular member supporting a pair of oppositely extending pivot pins, and internally of the annular member an anti-friction bearing connected to the shaft assembly.

15. The suspension structure of claim 11 wherein the second coupling means includes an anti-friction bearing connected to the shaft assembly.

16. The suspension structure of claim 15 wherein the second coupling means includes a trunnion member having a pair of oppositely longitudinally extending and substantially horizontally oriented pivot pins, the trunnion member being connected to the anti-friction bearing.

17. The suspension structure of claim 15 wherein the second coupling means includes a spherical bearing assembly connected between the anti-friction bearing and the distal end of the cross member.

18. A suspension structure for a track-type vehicle having a main frame and a track roller frame pivotally connected to the main frame, comprising:
    a wheel having a generally tubular housing and a shaft assembly rotatably disposed within the housing, support means for connecting the shaft assembly to the track roller frame and permitting the shaft assembly to rotate about a transversely oriented horizontal axis;
    a cross member;
    first coupling means for pivotally connecting the midpoint of the cross member to the main frame; and
    second coupling means for pivotally connecting the distal end of the cross member to the housing along the axis.

19. A suspension structure for a vehicle including a longitudinally extending main frame, a track roller frame, and pivot means for pivotally connecting the track roller frame to, the main frame, comprising:
    a wheel including a hydraulic drive motor having a housing and a shaft assembly rotatably supported in the housing;
    support means for connecting the housing to the track roller frame longitudinally away from the pivot means; and
    a pivoting support apparatus including an equalizer bar centrally connected to the main frame and having a distal end, and a coupling device connecting the distal end of the equalizer bar to the rotatable shaft assembly in a generally transversely aligned relationship.

20. The suspension structure of claim 19 wherein the coupling device includes an anti-friction bearing concentrically mounted on the shaft assembly.

21. The suspension structure of claim 20 wherein the coupling device includes a trunnion member having a pair of pivot pins arranged along a substantially horizontal and longitudinally oriented axis, the trunnion member being surroundingly connected to the anti-friction bearing.

22. The suspension structure of claim 20 wherein the coupling device includes an inner spherical bearing member and an outer spherically socketed bearing member mounted on the anti-friction bearing.

23. The suspension structure of claim 19 wherein the wheel has an inner wheel portion and an outer wheel portion releasably connected to the shaft assembly, and the support means includes a collar connected to the track roller frame laterally between the wheel portions and encircling the motor housing.

24. The suspension structure of claim 19 wherein the pivoting support apparatus includes another coupling device for pivotally connecting the midpoint of the equalizer bar to the main frame along a pivot axis, the shaft assembly having a transverse, horizontal axis that extends generally through the pivot axis.

25. The suspension structure of claim 19 wherein the track roller frame is pivotally connected to the main frame about another transverse, horizontal pivot axis, and the pivot axis of the another coupling device extends longitudinally to intersect the another pivot axis.

26. A suspension structure for a vehicle including a longitudinally extending main frame, a track roller frame, and pivot means for pivotally connecting the track roller to the main frame, comprising:
    a wheel including a hydraulic drive motor having a housing and a shaft assembly rotatably supported within the housing;
    support means for connecting the wheel to the track roller frame longitudinally away from the pivot means; and
    a pivoting support apparatus including an equalizer bar centrally connected to the main frame and having a distal end, and a coupling device connecting the distal end of the equalizer bar to the motor housing in a generally transversely aligned relationship.

27. The suspension structure of claim 26 wherein the coupling device includes a trunnion member connected to the motor housing and having a pair of pivot pins arranged along a substantially horizontal and longitudinally oriented axis that are pivotally received in the distal end of the equalizer bar.

* * * * *